United States Patent
McVey

(10) Patent No.: US 8,185,450 B2
(45) Date of Patent: May 22, 2012

(54) METHOD AND SYSTEM FOR SELF-SERVICE MANUFACTURE AND SALE OF CUSTOMIZED VIRTUAL GOODS

(75) Inventor: Susan Stanford McVey, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 12/138,377

(22) Filed: Jun. 12, 2008

(65) Prior Publication Data

US 2009/0312104 A1  Dec. 17, 2009

(51) Int. Cl.
*G06Q 30/00* (2006.01)

(52) U.S. Cl. ........................... 705/26.5; 705/26.1

(58) Field of Classification Search .............. 705/26, 705/27

See application file for complete search history.

(56) References Cited

U.S. PATENT DOCUMENTS

| | | | | |
|---|---|---|---|---|
| 6,105,008 | A | 8/2000 | Davis et al. | 705/41 |
| 6,404,426 | B1* | 6/2002 | Weaver | 345/419 |
| 7,249,139 | B2 | 7/2007 | Chuah et al. | 707/102 |
| 7,657,340 | B2 | 2/2010 | Lind | 700/132 |
| 7,729,951 | B2* | 6/2010 | Dawson et al. | 705/27.2 |
| 2004/0107125 | A1* | 6/2004 | Guheen et al. | 705/7 |
| 2004/0122553 | A1 | 6/2004 | Phan et al. | 700/233 |
| 2005/0137015 | A1* | 6/2005 | Rogers et al. | 463/42 |
| 2005/0143174 | A1* | 6/2005 | Goldman et al. | 463/42 |
| 2005/0177428 | A1* | 8/2005 | Ganz | 705/14 |
| 2005/0177453 | A1* | 8/2005 | Anton et al. | 705/26 |
| 2005/0192864 | A1* | 9/2005 | Ganz | 705/14 |
| 2006/0031128 | A1* | 2/2006 | Lamitie | 705/26 |
| 2007/0002057 | A1* | 1/2007 | Danzig et al. | 345/473 |
| 2008/0086382 | A1* | 4/2008 | Ur | 705/26 |
| 2008/0275789 | A1* | 11/2008 | Ganz et al. | 705/26 |
| 2008/0297515 | A1* | 12/2008 | Bliss | 345/473 |
| 2009/0248544 | A1* | 10/2009 | Ganz | 705/27 |

OTHER PUBLICATIONS

Microsoft Office Frontpage 2003 Inside and Out (Buyens, J., Sep. 3, 2003, Microsoft Press, p. 468).*

Plouznikoff, Alexandre, et al., *Enhancing Human-Machine Interactions: Virtual Interface Alteration Through Wearable Computers*, CHI 2006 Proceedings, Interaction Methods, Apr. 22-27, 2006, Montréal, Québec, Canada.

Jancke, Gavin, et al., *Linking Public Spaces: Technical and Social Issues*, CHI 2001, Mar. 31-Apr. 5, 2006, vol. No. 4, issue No. 1.

"Reebok in Second Live," http://www.youtube.com/watch?v=8-K5IDPcw1I, Feb. 13, 2007.

(Continued)

*Primary Examiner* — Adam Levine
*Assistant Examiner* — Ethan Civan
(74) *Attorney, Agent, or Firm* — Samuel K. Simpson; Patent Ingenuity, P.C.

(57) ABSTRACT

A computer program product is provided. The computer program product includes a computer useable medium having a computer readable program. The computer readable program when executed on a computer causes the computer to receive first customization request data and second customization request data for a virtual object to be purchased by a user in a virtual world computing environment. Further, the computer readable program when executed on a computer causes the computer to encode the first customization request data and the second customization request data into a value. In addition, the computer readable program when executed on a computer causes the computer to invoke an instantiation of the virtual object such that the virtual object has a customizable component.

23 Claims, 4 Drawing Sheets

OTHER PUBLICATIONS

"CMAX Promotional Footwear," http://web.archive.org/web/20040405163227/http://promo.customatix.com/, Apr. 5, 2004.

"Fascinating Facts about the Invention of Cabbage Patch kids by Xavier Roberts in 1983," http://www.ideafinder.com/history/inventions/cabbagepatch.htm, Oct. 25. 2006.

* cited by examiner

METHOD AND SYSTEM FOR SELF-SERVICE MANUFACTURE AND SALE OF CUSTOMIZED VIRTUAL GOODS

BACKGROUND

1. Field

This disclosure generally relates to software. More particularly, the disclosure relates to virtual world computing environments.

2. General Background

Virtual worlds have become popular phenomena. A computerized system may create a virtual world such that users may associate themselves with virtual characters. The virtual characters may do things that are very similar to real life. For example, the virtual characters may interact with other virtual characters, shop at virtual stores, etc.

In current virtual worlds, virtual retail vendors must create and stock many separate versions of each inventory item so that virtual customers can have a choice of colors, styles, and other options. As a result, virtual shop space needs to be occupied by a large amount of inventory. Further, time needs to be spent building different versions of each virtual product. In addition, a large cost is typically incurred in terms of system resources.

SUMMARY

In one aspect of the disclosure, a computer program product is provided. The computer program product includes a computer useable medium having a computer readable program. The computer readable program when executed on a computer causes the computer to receive first customization request data and second customization request data for a virtual object to be purchased by a user in a virtual world computing environment. Further, the computer readable program when executed on a computer causes the computer to encode the first customization request data and the second customization request data into a value. In addition, the computer readable program when executed on a computer causes the computer to invoke an instantiation of the virtual object such that the virtual object has a customizable component. Finally, the computer readable program when executed on a computer causes the computer to send the value to the virtual object so that a first customizable feature routine in the virtual object extracts the first customization request data from the value to customize the customizable component of the virtual object according to the first customization request data and so that a second customizable feature routine in the virtual object extracts the second customization request data from the value to customize the customizable component of the virtual object according to the second customization request data.

In another aspect of the disclosure, a process is provided. The process receives first customization request data and second customization request data for a virtual object to be purchased by a user in a virtual world computing environment. Further, the process encodes the first customization request data and the second customization request data into a value. In addition, the process invokes an instantiation of the virtual object such that the virtual object has a customizable component. The process also sends the value to the virtual object so that a first customizable feature routine in the virtual object extracts the first customization request data from the value to customize the customizable component of the virtual object according to the first customization request data and so that a second customizable feature routine in the virtual object extracts the second customization request data from the value to customize the customizable component of the virtual object according to the second customization request data.

In yet another aspect of the disclosure, a system is provided. The system includes a reception module that receives first customization request data and second customization request data for a virtual object to be purchased by a user in a virtual world computing environment. Further, the system includes an encoding module that encodes the first customization request data and the second customization request data into a value. In addition, the system includes an instantiation module that invokes an instantiation of the virtual object such that the virtual object has a customizable component. Finally, the system includes a transmission module that sends the value to the virtual object so that a first customizable feature routine in the virtual object extracts the first customization request data from the value to customize the customizable component of the virtual object according to the first customization request data and so that a second customizable feature routine in the virtual object extracts the second customization request data from the value to customize the customizable component of the virtual object according to the second customization request data.

In another aspect of the disclosure, a computer program product is provided. The computer program product includes a computer useable medium having a computer readable program. The computer readable program when executed on a computer causes the computer to receive customization request data for a virtual object to be purchased by a user in a virtual world computing environment. Further, the computer readable program when executed on a computer causes the computer to encode the customization request data into a value. In addition, the computer readable program when executed on a computer causes the computer to invoke an instantiation of the virtual object such that the virtual object has a customizable component. The computer readable program when executed on a computer also causes the computer to send the value to the virtual object so that a customizable feature routine in the virtual object extracts the customization request data from the value to customize the customizable component of the virtual object according to the customization request data.

DRAWINGS

The above-mentioned features of the present disclosure will become more apparent with reference to the following description taken in conjunction with the accompanying drawings wherein like reference numerals denote like elements and in which.

DETAILED DESCRIPTION

A method and system generates and sells customized versions of one or more base objects in a virtual world computing environment. The customer, i.e., end user is able to specify the desired colors, styles, textures, and other available options. In one embodiment, a virtual vending machine generates the specified merchandise immediately and offers it for sale. This method and system allows mass customization of virtual goods. As a result, virtual retail shops may provide increased inventory at a decreased cost in terms of resources, shop space, and time spent building the different versions of each object.

The scripts provided herein are intended to illustrate examples of routines and are not intended to be limiting. Accordingly, a variety of routines may be utilized in place of specific scripts that are discussed in these examples.

Figure 1:
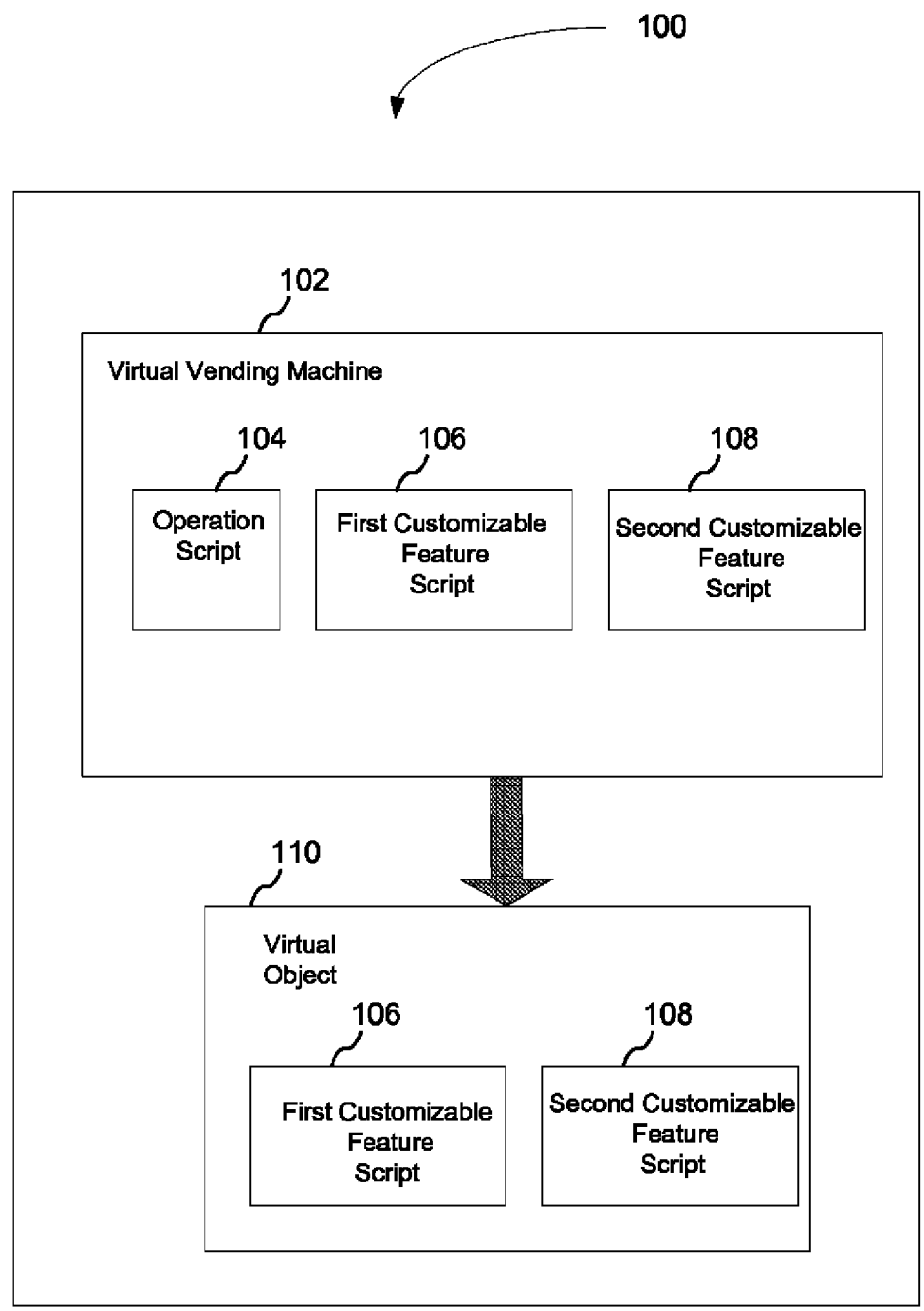
FIG. 1 illustrates a virtual customization system.

FIG. 1 illustrates a virtual customization system 100. In one embodiment, the virtual customization system 100 includes a virtual vending machine 102, an operation script 104, a first customizable feature script 106, and a second customizable feature script 108. The virtual vending machine 102 includes one or more items of customizable virtual objects 110, e.g., customizable virtual merchandise. Further, the operation script 104 is utilized for the operation of the virtual vending machine 102. In addition, the first customizable feature script 106 and the second customizable script 108 are utilized for customizable components, i.e., prims, of the virtual object 110. For example, a prim may be a cushion for a virtual chair. A first feature may be the size of the cushion and a second feature may be the color of the cushion. Accordingly, the first customizable feature script 106 may be a script to instantiate a first feature for a component of the virtual object 110 and a second customizable feature script may be a script to instantiate a second feature for that component, or possibly a different component, of the virtual object 110.

The operation script 104 manages the user transaction. When a customer touches the virtual vending machine, the operation script 104 opens one or more dialog windows in the user's virtual world client software to ask the user questions such as "which color would you like?" and receives and records the customer's requests. The operation script 104 then encodes the customization requests into a single integer value, i.e., parameter, and passes the parameter to the virtual object to be sold. Accordingly, an instantiation ("rez") of that virtual object is invoked. Each customizable prim within the virtual object contains a script which changes the color, size, etc. of the prim based on the value of the parameter. Upon rezzing the virtual object 110, each prim customizes itself. In other words, the value may include some data for the cushion of the chair and other data for the armrest of the chair. For purposes of instantiation, each prim, e.g., the cushion and the armrest, obtains the relevant data from the value that it needs and may disregard the additional data for other prims that is not needed. For example, the value may include information regarding the size of the cushion, which will be relevant to the cushion prim, but not to the armrest prim. Further, a feature may have applicability to multiple prims. For example, the color feature may be applicable to both the cushion and the armrest so that the cushion and the armrest are the same color. However, these features may also be different as the customer may want different colors for the cushion and the armrest. The customer then has the opportunity to purchase the virtual object 110, or simply to take it or copy it if it is being offered for free. The virtual vending machine 102 can, optionally, allow the customer to choose whether to purchase or decline the virtual object 110. Any unclaimed objects can be deleted by the virtual vending machine 100 when declined or after a preset period of time has passed without a sale transaction being completed. In another embodiment, the customization may include random factors so that slightly different and unique virtual objects can be generated.

Although two customizable feature scripts are illustrated in FIG. 1 for illustrative purposes, more than two customizable feature scripts may be utilized. Further, only one customizable feature script may be utilized.

In one embodiment, the customizable feature scripts reside within the virtual object 110. Further, the virtual object 110 is within the virtual vending machine 102. When the virtual vending machine 102 is operated, the virtual vending machine 102 makes a copy of the virtual object 110, which may include a copy of the customizable feature scripts. In an alternative embodiment, the copied virtual object 110 does not include the customizable feature scripts because the virtual vending machine 102 removes the customizable feature scripts before the vending the copied virtual object 110.

Figure 2:
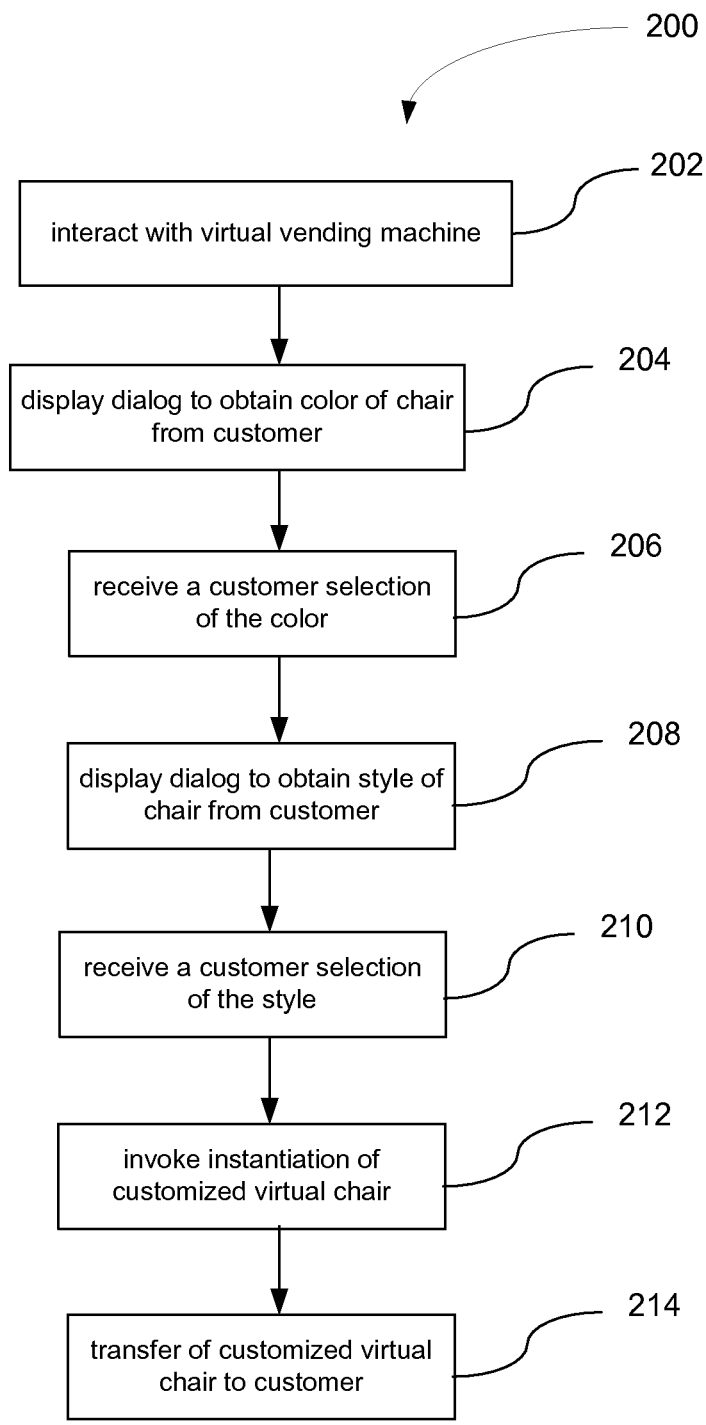
FIG. 2 illustrates an example of a process that may be utilized in the operation of the virtual vending machine 102 as illustrated in FIG. 2.

FIG. 2 illustrates an example of a process 200 that may be utilized in the operation of the virtual vending machine 102 as illustrated in FIG. 2. At a process block 202, a customer interacts with, e.g., touches, the virtual vending machine 102 to potentially purchase a virtual chair. Further, at a process block 204, a dialog is displayed in the customer's user interface to obtain the color that the customer would like, e.g., to ask "What color chair would you like?" The dialog may also provide a list of colors. In addition, at a process block 206, a customer selection of a color is received. For example, the selected color may be blue. In one embodiment, the customer inputs the selected color. In another embodiment, the customer selects the color from a list of colors. At a process block 208, a dialog is displayed in the customer's user interface to obtain the style that the customer would like, e.g., to ask "Which style of chair would you like?" The dialog may also offer a choice such as "With Armrests?" or "Without Armrests?" Further, at a process block 210, the customer selects a style. For example, the customer may select "With Armrests." In one embodiment, the customer provides input to select the style. In another embodiment, the customer selects the style from a list of styles. Further, at a process block 212, an instantiation of the customized virtual chair is invoked, i.e., rezzed. For example, a blue chair with armrests may be rezzed. Finally, at a process block 214, the customized virtual chair is transferred, e.g., sold, to the customer.

In one embodiment, prior to rezzing the virtual object 110 at the process block 212, all of the customer's choices may be encoded into a value. An example of the value may be a single integer value. A variety of other types of values may be utilized. The value may be passed to the rezzed virtual object 110 so that the virtual object 110 knows how to customize itself. As an example, the color and style customer selections may be encoded as rezParam=colorindex+100*styleindex. The virtual object 100 may be rezzed by a function call that receives rezParam. An example of such a function call may be llRezObject("Custom Color Chair 2.4", llGetPos( )+ObjOffset, ZERO_VECTOR, ZERO_ROTATION, rezParam). When the virtual chair is rezzed, each prim of the virtual chair receives rezParam and uses it to determine what actions, if any, it should take. For example, the chair cushion extracts the color index from rezParam by taking rezParam mod 100, and then it calls the llSetColor( ) function to change its own color.

In addition to using rezParam to customize the rezzed objects, the virtual vending machine 102 can choose from a set of different base objects. For example, a customizable feature script may choose between two styles of chairs (with arms and without arms) rather than actually using rezParam to cause the armrests to be added or deleted.

Figure 3:
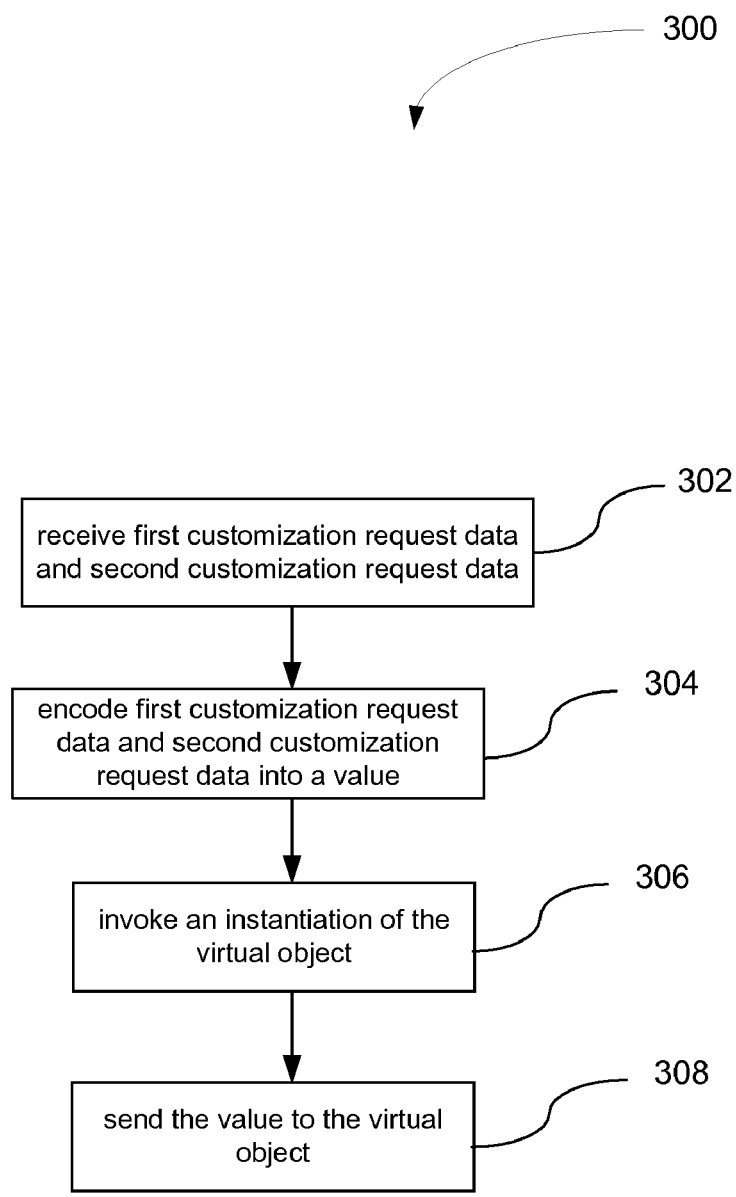
FIG. 3 illustrates a process that customizes a virtual object.

FIG. 3 illustrates a process 300 that customizes a virtual object. At a process block 302, the process 300 receives first customization request data and second customization request data for a virtual object to be purchased by a user in a virtual world computing environment. Further, at a process block 304, the process 300 encodes the first customization request data and the second customization request data into a value. In addition, at a process block 306, the process 300 invokes an instantiation of the virtual object such that the virtual object has a customizable component. At a process block 308, the process 300 also sends the value to the virtual object so that a first customizable feature routine in the virtual object extracts the first customization request data from the value to customize the customizable component of the virtual object according to the first customization request data and so that a second customizable feature routine in the virtual object extracts the second customization request data from the value to customize the customizable component of the virtual object according to the second customization request data.

Figure 4:
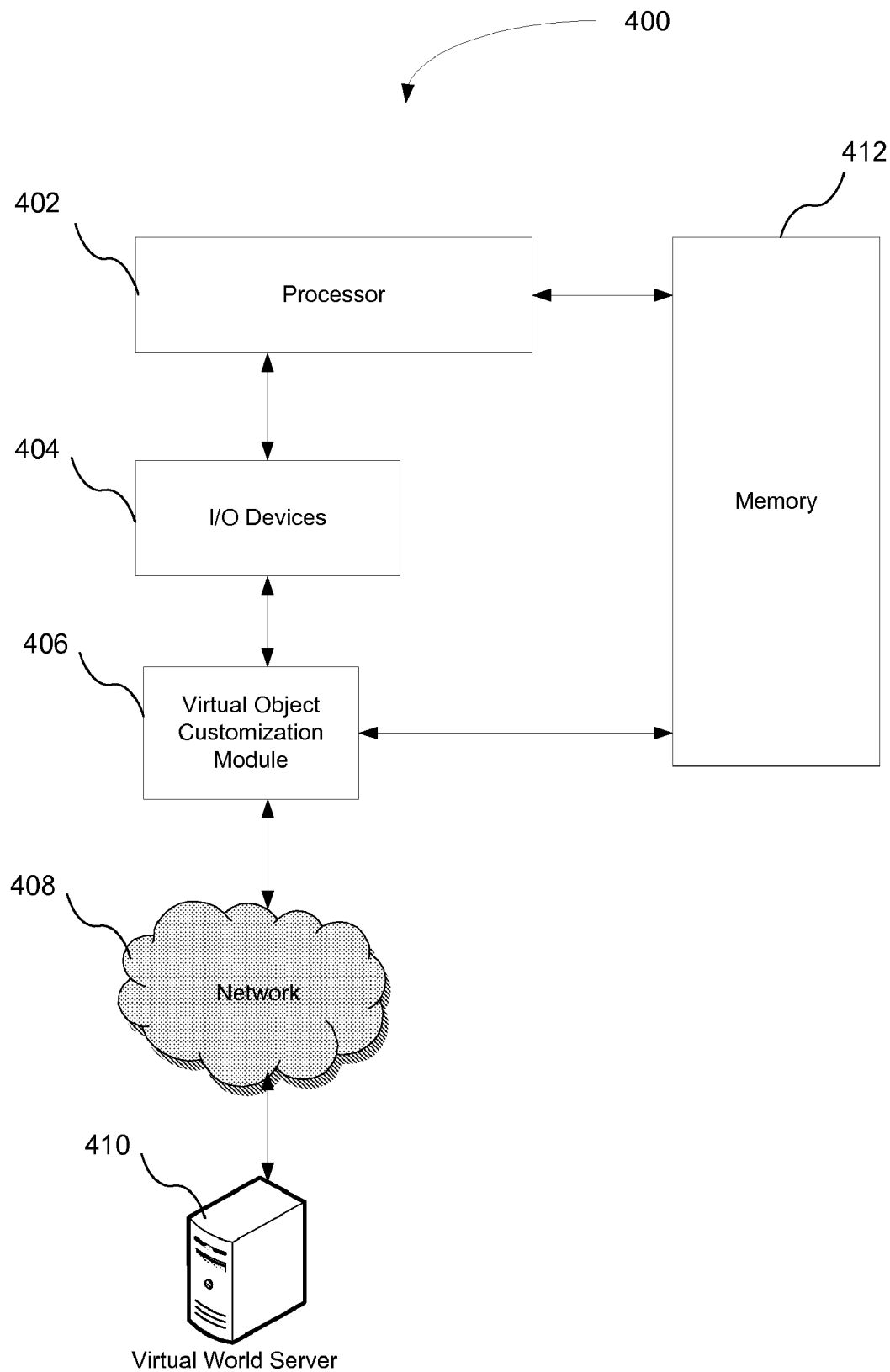
FIG. 4 illustrates a block diagram of a system that customizes a virtual object.

FIG. 4 illustrates a block diagram of a system 400 that customizes a virtual object. In one embodiment, the system 400 is suitable for storing and/or executing program code and is implemented using a general purpose computer or any other hardware equivalents. Thus, the system 400 comprises a processor 402, a memory 412, e.g., random access memory ("RAM") and/or read only memory ("ROM"), a virtual object customization module 406, a network 408, a virtual world server 410, and various input/output devices 404.

The processor 402 is coupled, either directly or indirectly, to the memory 412 through a system bus. The memory 412 can include local memory employed during actual execution of the program code, bulk storage, and/or cache memories which provide temporary storage of at least some program code in order to reduce the number of times code must be retrieved from bulk storage during execution.

The input/output devices 404 can be coupled directly to the system 400 or through intervening input/output controllers. Further, the input/output devices 404 can include a keyboard, a keypad, a mouse, a microphone for capturing speech commands, a pointing device, and other user input devices that will be recognized by one of ordinary skill in the art. Further, the input/output devices 404 can include a receiver, transmitter, speaker, display, image capture sensor, biometric sensor, etc. In addition, the input/output devices 404 can include storage devices such as a tape drive, floppy drive, hard disk drive, compact disk ("CD") drive, etc.

Network adapters may also be coupled to the system 400 to enable the system 500 to become coupled to other systems, remote printers, or storage devices through intervening private or public networks. Modems, cable modems, and Ethernet cards are just a few of the currently available types of network adapters.

The virtual object customization module 406 interacts with the virtual world server 410 through the network 408. In embodiment, the virtual object customization module 406 is executed partly on a user's computer and partly on the virtual world server 410. In another embodiment, the virtual object customization module 406 is executed entirely on the user's computer. In yet another embodiment, the virtual object customization module 406 is executed entirely on the virtual world server 410.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W"), and DVD.

In one embodiment, the virtual object customization module 406, e.g., a customizable feature script, is not needed for all of the customizations in the virtual configuration system 100. Instead, some or all of the customizations, e.g., data transmission and/or user interaction infrastructure, may be handled by services of the virtual computing environment itself.

While the apparatus and method have been described in terms of what are presently considered to be the most practical and preferred embodiments, it is to be understood that the disclosure need not be limited to the disclosed embodiments. For instance, the parameters that may be customized are not intended to be limited to color, style, and dimension, but rather to any type of customizable parameter. Other examples of customizations include, but are not limited to, brand names for a virtual soda, convertible or hard-top for a virtual automobile, and high wing/low wing, number of passenger seats, and tripod gear or taildragger configuration for a virtual airplane. These examples are provided merely for illustrative purposes as many other like configurations may be customized with the apparatus and method provided herein. Further, the apparatus and method may be utilized in any virtual computing environment in which object creation and/or self-modification is allowed. The disclosure is intended to cover various modifications and similar arrangements included within the spirit and scope of the claims, the scope of which should be accorded the broadest interpretation so as to encompass all such modifications and similar structures. The present disclosure includes any and all embodiments of the following claims.

I claim:

1. A computer program product comprising a computer useable storage medium having a computer readable program, wherein the computer readable program when executed on a computer causes the computer to:

receive first customization request data corresponding to a first customizable component of a virtual object in a virtual world computing environment and second customization request data corresponding to a second customizable component for the virtual object, the first customizable component being distinct from the second customizable component, the virtual object being purchased by a user in a virtual world computing environment;

encode the first customization request data and the second customization request data into a value;

invoke an instantiation of the virtual object such that the virtual object has the first customizable component and the second customizable component; and send the value to the virtual object so that a first customizable feature routine in the virtual object extracts the first customization request data, without the second customization request data, from the value to customize the first customizable component of the virtual object according to the first customization request data and so that a second customizable feature routine in the virtual object extracts the second customization request data, without the first customization request data, from the value to customize the second customizable component of the virtual object according to the second customization request data.

2. The computer program product of claim 1, wherein the value is an integer value.

3. The computer program product of claim 1, wherein the value is a numerical value.

4. The computer program product of claim 1, wherein the first customization request is a request of a color of the virtual object.

5. The computer program product of claim 1, wherein the first customization request is a request of a style of the virtual object.

6. The computer program product of claim 1, wherein the first customization request is a request of a size dimension of the virtual object.

7. The computer program product of claim 1, wherein the first customization request is a request of a shape of the virtual object.

8. The computer program product of claim 1, wherein the virtual object is purchased by the user in the virtual world computing environment from a virtual vending machine.

9. The computer program product of claim 1, wherein the user has a virtual character in the virtual world computing environment.

10. A method comprising:
   receiving first customization request data corresponding to a first customizable component of a virtual object in a virtual world computing environment and second customization request data corresponding to a second customizable component for the virtual object, the first customizable component being distinct from the second customizable component, the virtual object being purchased by a user in a virtual world computing environment;
   encoding, with a processor, the first customization request data and the second customization request data into a value;
   invoking an instantiation of the virtual object such that the virtual object has athe first customizable component and the second customizable component; and
   sending the value to the virtual object so that a first customizable feature routine in the virtual object extracts the first customization request data, without the second customization request data, from the value to customize the first customizable component of the virtual object according to the first customization request data and so that a second customizable feature routine in the virtual object extracts the second customization request data, without the first customization request data, from the value to customize second the customizable component of the virtual object according to the second customization request data.

11. The method of claim 10, wherein the value is an integer value.

12. The method of claim 10, wherein the value is a numerical value.

13. The method of claim 10, wherein the first customization request is a request of a color of the virtual object.

14. The method of claim 10, wherein the first customization request is a request of a style of the virtual object.

15. The method of claim 10, wherein the first customization request is a request of a size dimension of the virtual object.

16. The method of claim 10, wherein the first customization request is a request of a shape of the virtual object.

17. The method of claim 10, wherein the virtual object is purchased by the user in the virtual world computing environment from a virtual vending machine.

18. The method of claim 10, wherein the user has a virtual character in the virtual world computing environment.

19. A system comprising:
   a reception module that receives first customization request data corresponding to a first customizable component of a virtual object in a virtual world computing environment and second customization request data corresponding to a second customizable component for the virtual object, the first customizable component being distinct from the second customizable component, the virtual object being purchased by a user in a virtual world computing environment;
   a processor for encoding the first customization request data and the second customization request data into a value;
   an instantiation module that invokes an instantiation of the virtual object such that the virtual object has a the first customizable component and the second customizable component; and
   a transmission module configured to send the value to the virtual object so that a first customizable feature routine in the virtual object extracts the first customization request data, without the second customization request data, from the value to customize the first customizable component of the virtual object according to the first customization request data and so that a second customizable feature routine in the virtual object extracts the second customization request data, without the first customization request data, from the value to customize the second customizable component of the virtual object according to the second customization request data.

20. The system of claim 19, wherein the value is an integer value.

21. The system of claim 19, wherein the value is a numerical value.

22. The system of claim 19, wherein the virtual object to be purchased by the user in the virtual world computing environment is from a virtual vending machine.

23. The system of claim 19, wherein the user has a virtual character in the virtual world computing environment.

* * * * *